United States Patent [19]
Dolan et al.

[11] Patent Number: 5,154,440
[45] Date of Patent: Oct. 13, 1992

[54] COUPLER LOCK

[75] Inventors: Robert A. Dolan, Chandler; Gerald L. Schuld, Mesa, both of Ariz.

[73] Assignee: U-Haul International, Inc., Phoenix, Ariz.

[21] Appl. No.: 575,142

[22] Filed: Aug. 29, 1990

[51] Int. Cl.⁵ .............................................. B60D 1/58
[52] U.S. Cl. .................................. 280/507; 280/511; 70/202; 70/258
[58] Field of Search ............... 280/504, 507, 511, 512, 280/513; 70/58, 202, 203, 258

[56] References Cited

U.S. PATENT DOCUMENTS

| | | | |
|---|---|---|---|
| 2,166,208 | 7/1939 | Dayton | 280/513 |
| 2,189,710 | 2/1940 | Draeger | 280/511 |
| 2,197,267 | 4/1940 | Gilmore | 280/511 |
| 2,250,661 | 7/1941 | Thorp | 280/502 |
| 2,435,857 | 2/1948 | Werner | 74/528 |
| 2,891,806 | 6/1959 | Haverly | 280/511 |
| 3,391,555 | 7/1968 | Mamo | 280/507 |
| 3,770,299 | 11/1973 | Murphy | 280/507 |
| 4,756,172 | 7/1988 | Weaver | 70/58 |

FOREIGN PATENT DOCUMENTS

8701608  2/1989  Netherlands ............. 280/512

Primary Examiner—Kenneth R. Rice
Assistant Examiner—Victor E. Johnson
Attorney, Agent, or Firm—Spensley Horn Jubas & Lubitz

[57] ABSTRACT

A locking mechanism for a trailer coupler such as a ball and socket coupler having a release handwheel. The locking mechanism includes a shelf which in one embodiment, surrounds the handwheel to prevent accidental or unauthorized rotation of the release handwheel. In other embodiments, the shelf covers or abuts the handwheel. A padlock may be used to lock the locking shelf in position.

29 Claims, 7 Drawing Sheets

COUPLER LOCK

FIELD OF THE INVENTION

The present invention relates generally to an improved coupler mechanism, and more particularly, to a coupler mechanism having an improved locking mechanism associated therewith.

BACKGROUND OF THE INVENTION

One well known type of coupler mechanism, the trailer hitch, is commonly used to secure a trailer to a vehicle for transport. Typically, such coupler mechanisms include a standard ball and socket arrangement which incorporates a retaining mechanism for securing the hitch in a retention or coupled position. The retaining mechanism, which commonly includes a user manipulable handwheel, when properly operated provides a retaining force between the ball and socket, thereby securing the trailer to the towing vehicle.

Many prior ball and socket hitches include a retaining tab which engages a recess formed in the periphery of the handwheel. When properly engaged within the recess, the retaining tab can inhibit rotation of the handwheel, and thereby preventing accidental loosening of the retaining mechanism.

While the retaining tab can help prevent accidental loosening of the retaining mechanism during transport of the trailer, the tab generally does not prevent or deter unauthorized removal of the trailer from the vehicle. Since many trailers are used to haul valuable items, such as boats, cars, household belongings, etc., they are highly visible and attractive targets for criminal activity.

SUMMARY OF THE INVENTION

It is an object of the present invention to provide a coupler mechanism obviating, for practical purposes, the above mentioned limitations, particularly in a manner requiring a relatively uncomplicated mechanical arrangement.

These and other objects and advantages are provided by a coupler lock mechanism having in accordance with a preferred embodiment of the invention, a retaining shelf movable between a free position and a deployed position. In one aspect of the invention, the retaining shelf has a portion configured so as to receive a portion of the periphery of the user manipulable handwheel of the retaining mechanism and to prevent rotation thereof when the retaining shelf is in the deployed position. Means such as a padlock are provided for securing the retaining shelf in the deployed position. As a consequence, the handwheel may not be rotated until the padlock and shelf are removed, thereby preventing theft of the trailer or loosening of the handwheel during travel.

In the illustrated embodiment, the retaining shelf is integrally attached to pivotable L-shaped extending brackets, which allow the shelf to be easily pivoted between the deployed and free positions. The shelf has an opening which is substantially similar in shape to the handwheel. In the deployed position, the retaining shelf opening surrounds the handwheel, thereby inhibiting any rotational motion thereof.

BRIEF DESCRIPTIONS OF THE DRAWINGS

For the purpose of facilitating an understanding of the invention, the accompanying drawings illustrate a preferred embodiment. The above and other objects of the invention, as well as the features thereof as summarized above, will become more apparent from the following description when taken in conjunction with the accompanying drawings.

DETAILED DESCRIPTION OF THE DRAWINGS

While the invention is susceptible of various modifications and alternative constructions, a certain illustrated embodiment thereof has been shown in the drawings and will be described in detail. It should be understood, however, that there is no intention to limit the invention to the specific forms illustrated and described, but on the contrary, the intention is to cover all modifications, alternative constructions and equivalents falling within the spirit and scope of the invention.

Turning now to the drawings, there is shown in FIGS. 1-4 a coupler lock mechanism 10 in accordance with a preferred embodiment of the present invention. For illustrative purposes only, the coupler lock mechanism 10 shown in this embodiment incorporates a standard ball and socket coupler mechanism which is similar in design and function to the coupler mechanism manufactured and sold by Fulton Manufacturing Co., and described in U.S. Pat. No. 2,250,661 which is incorporated herein by reference. While the coupler lock mechanism of the present invention is adapted to accommodate such couplers, it should further be appreciated that the invention is adaptable to coupler mechanisms of many designs and configurations which include an adjustable handwheel for securing a trailer to a vehicle.

For purposes of explanation, and to further assist in the understanding of this invention, a brief description of the operation of a standard ball and socket coupler mechanism follows. A hitching ball 22 is commonly affixed to the tow vehicle utilizing a standard mounting device which is capable of supporting the tongue weight of the trailered vehicle. Similarly, a coupler 20 is affixed, by commonly known techniques, e.g. welding, bolting, etc., to the frame of the trailered vehicle, thus forming an integrated frame unit. The coupler 20 has a ball-shaped socket 24 which receives the hitching ball 22 when the trailer is hitched to the vehicle. In operation the trailer coupler socket 24 is lowered, from an elevated height, relative to the hitching ball 22, onto the hitching ball 22 such that the socket 24 engulfs the hitching ball 22.

The ball and socket coupler further includes a user manipulable handwheel 26. The handwheel 26 is rotatably mounted upon the threaded member 29 such that rotation of the handwheel 26 draws or urges the threaded member 29 and a retention flange 25 depending from the member 29 either towards or away from the hitching ball 22. In this embodiment, the retention flange 25 has a curved surface which conforms to the curved surface of the hitching ball 22. Upon rotation of the handwheel 26 in the appropriate direction (usually clockwise), the retention flange 25 is drawn towards the hitching ball 22, thereby decreasing the effective opening dimension of the socket 24. In this retention position, the hitching ball 22 is prevented from being removed from the socket 24. Similarly, upon rotation of the handwheel 26 in the opposite direction (typically counterclockwise), the retention means 25 is moved distally from said hitching ball 22 to a release position, which allows the hitching ball 22 to be released from the socket 24.

A spring loaded retaining tab 30 (see FIGS. 2 and 6) is usually provided in ball and socket hitches in order to maintain the retention flange 25 in the retention position. The tab 30 has a projection 31 which engages recesses 27 formed in the periphery of the handwheel 26. The tab 30 exerts a biasing force against the wheel recess 27 to maintain the tab 30 in engagement with the handwheel 26. When engaged, the tab 30 prevents rotation of the handwheel 26, rotation being permitted only when the projection 31 of tab 30 is pivoted away from the recess 27 in the handwheel periphery.

Having described the operational characteristics of a typical ball and socket coupler mechanism, the features of the coupler lock mechanism of the present invention will now be more readily understood.

The coupler lock mechanism 10, as shown in this embodiment, includes two extending L-shaped brackets 40. The arms 40 are spaced such that the space therebetween "x" is slightly greater than the width dimension "w" of the trailer coupler 20 upon which it is to be mounted. This spacing not only ensures that the coupler lock mechanism 10 can be easily and economically mounted to a standard trailer coupler mechanism, but further ensures that the coupler lock mechanism 10 is easily pivotable between a deployed and free position, unencumbered by frictional forces between the surfaces of the arms 40 and trailer frame 50.

The coupler lock mechanism 10 is pivotally attached to the trailer coupler 20 by a cylindrical pivot pin 60. A first extending leg 42 of the L-shaped bracket 40 includes pin receiving apertures 44 positioned to align with corresponding holes 52 in the trailer coupler 20. The cylindrical pivot pin 60, of a predetermined length and diameter, is permanently positioned within the holes 52 and apertures 44. While there are many acceptable techniques for attaching the pivot pin 60 to the arms 40, in this embodiment, the two components are preferably welded together preventing easy removal of the pin 60, and hence the coupler lock 10, from the coupler 20.

As further shown in the drawings, each of the L-shaped brackets 40 further includes a second extending leg 46. As shown in this embodiment, the second extending leg 46 is of a predetermined length. In particular, the second extending leg 46 extends to a height substantially equal to the projected height of the upper surface of handwheel 26. The projected handwheel height is determined when the handwheel 26 has been manipulated so as to place the retention means 25 in a retention position. The importance of this design parameter, in conjunction with the objectives of the invention, will be more fully discussed in the following paragraphs of this specification.

Integrally attached to the second extending leg 46 of the L-shaped arms 40 is retaining shelf 70. Since the coupler lock 10 is a security device, it is preferable that the retaining shelf 70 and arms 40 be attached such that an integral structure is formed. While there are many acceptable techniques for attaching the retaining shelf 70 to the arms 40, in this embodiment, the two components are preferably welded together. Although it is further appreciated that an integrally formed structure may also be obtained through known casting techniques.

Figure 2:
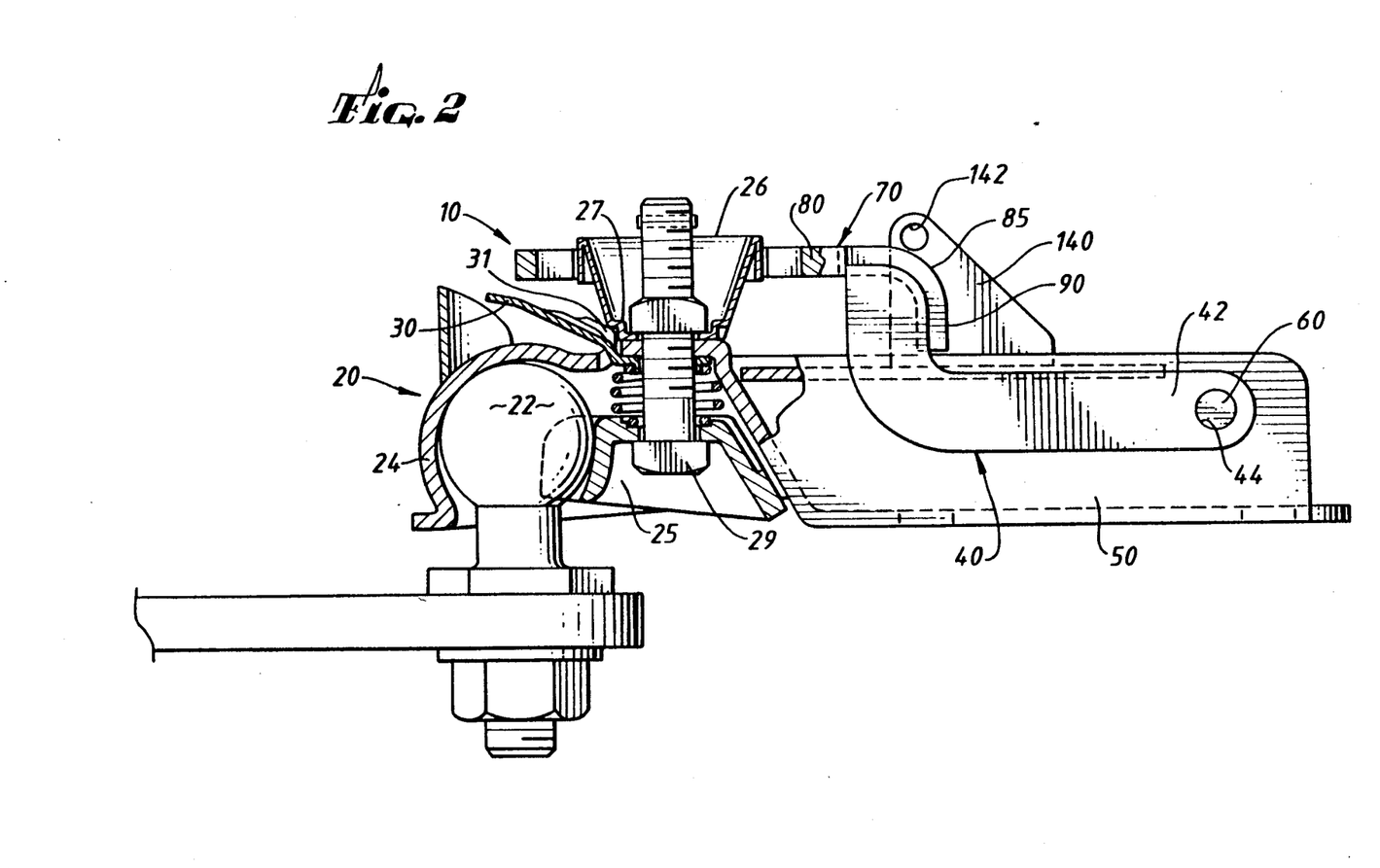
FIG. 2 is a side view, in partial section, of the coupler lock mechanism of FIG. 1.
Figure 3:
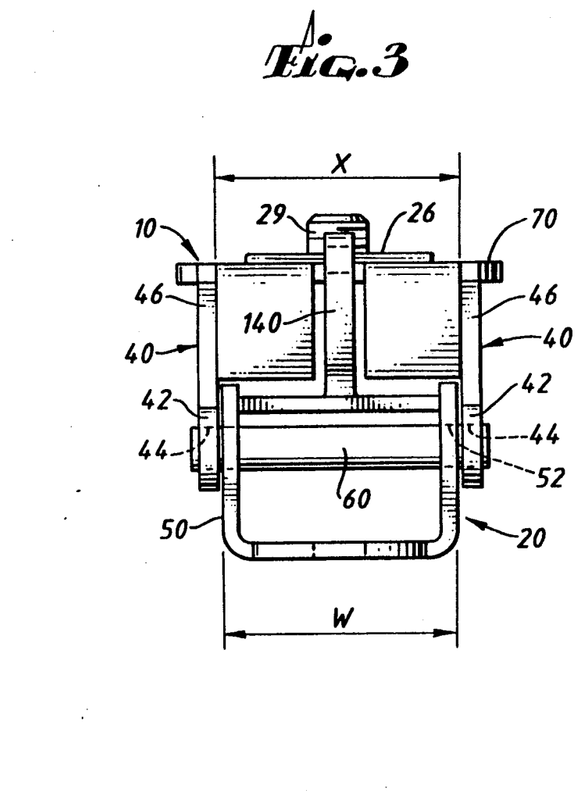
FIG. 3 is an end view of the coupler lock mechanism of FIG. 1.
Figure 4:
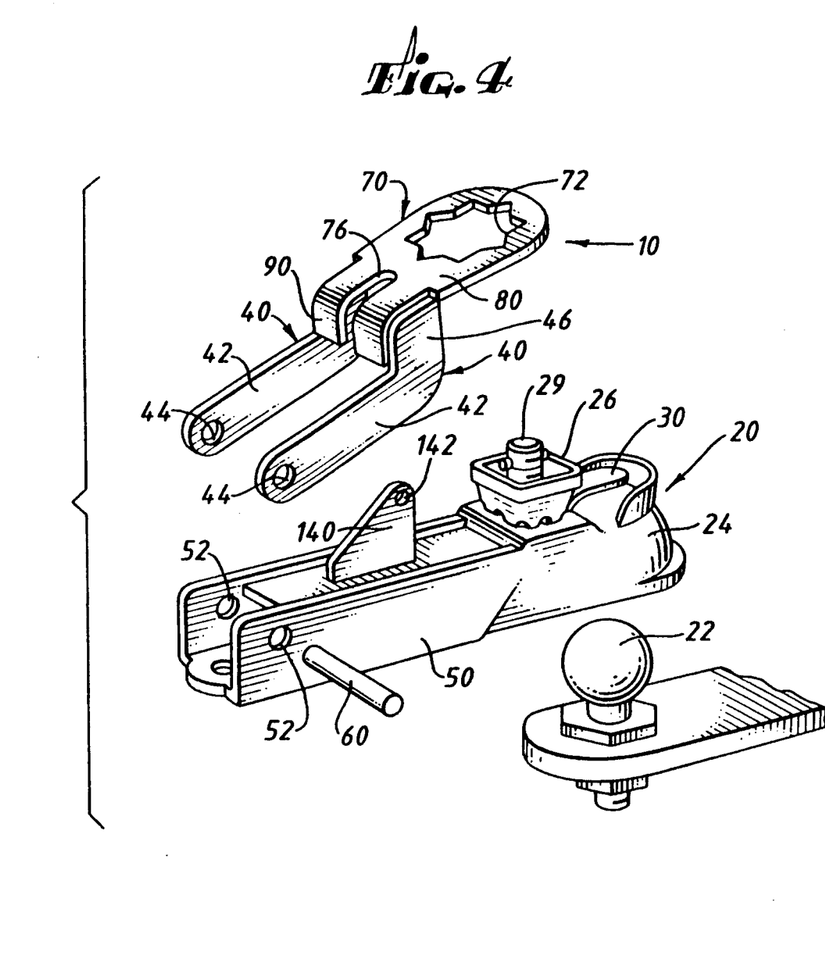
FIG. 4 is a perspective and exploded view of the coupler lock mechanism of FIG. 1.

As shown in this embodiment, the retaining shelf 70 is shaped so as to form two perpendicular planar portions 80, 90 having an arcuate surface 85 connecting the planes. As best shown in FIG. 2, the horizontal planar portion 80 lies substantially parallel to the trailer frame 50 when the coupler lock 10 is in a locked or deployed position.

Figure 1:
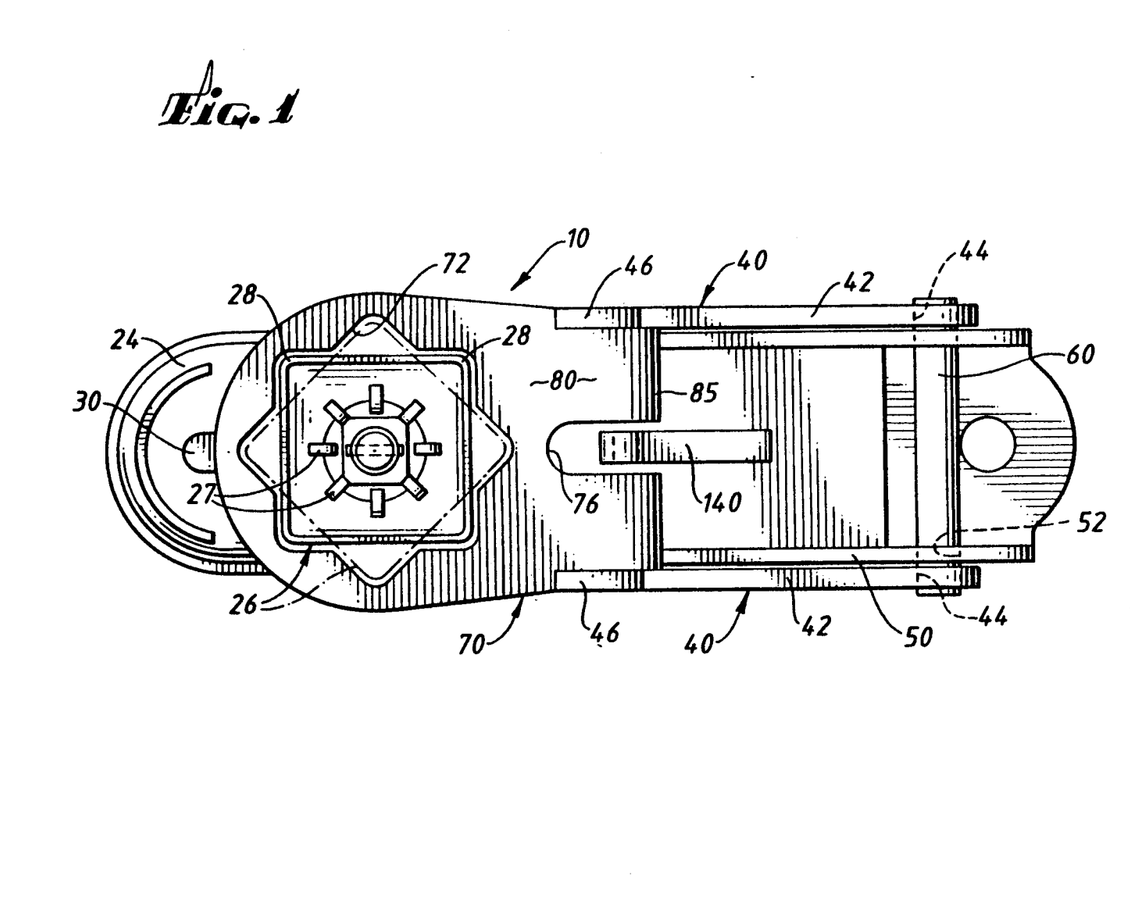
FIG. 1 is a top view of a coupler lock mechanism in accordance with a preferred embodiment of the present invention.

In accordance with the invention, retaining shelf 70 is formed with two openings, namely, handwheel opening 72 and locking flange opening 76. As best shown in FIG. 1, handwheel opening 72 is formed in horizontal planar portion 80 for surrounding the handwheel 26 of the coupler mechanism 20. In this embodiment, the perimeter of the handwheel opening 72 is shaped as an 8-pointed star so as to accommodate the substantially square handwheel 26 of the ball and socket coupler in one of two alignment orientations. As shown, the handwheel 26 may be positioned within the handwheel opening 72, so as to be surrounded by the horizontal planar portion 80 in its deployed position by aligning the corners 28 of the handwheel 26 with the perimeter of opening 72. The perimeter opening is configured such that handwheel 26 need merely be rotated a maximum of 45°, from any position, in order to be properly aligned within the perimeter opening 72. In a first position, the handwheel 26 is aligned about an axis substantially parallel to the sidewalls of the trailer frame 50. A second position is defined when the handwheel is rotated 45° from the first position. While a standard ball and socket coupler has been shown in this embodiment, it should be appreciated that the perimeter opening 72 can be shaped so as to accommodate handwheels of a variety of shapes and sizes, each having different perimeter projections. The perimeter shapes of the handwheel and corresponding opening chosen in this preferred embodiment are merely exemplary and should not be construed so as to limit the scope of this invention.

When the handwheel 26 has been properly aligned, and the coupler lock mechanism 10 has been pivoted to its deployed position, a position wherein the horizontal planar portion 80 is substantially parallel to the trailer frame 50, the handwheel 26 is effectively immobilized by the surrounding shelf 70. In order to further rotate the handwheel 26, for purposes of moving the retaining means to a release position, the coupler lock mechanism 10 must be pivoted to its free position, where the retaining shelf no longer surrounds the handwheel 26.

In accordance with the invention, means for securing the retaining shelf 70 in the deployed position are provided. Aperture 76 is formed in the arcuate surface 85 of retaining shelf 70, and is configured to receive locking flange 140 therein. As shown in the illustrated embodiment, locking flange 140 is attached to the trailer frame 50 by welding or other suitable means, and extends through the shelf aperture 76 when the retaining shelf 70 is in the deployed position. A locking aperture 142, having a predetermined diameter, is provided for the insertion of the clasp of a commonly available padlock therethrough. The locking aperture 142 is positioned within the flange 140 so that the aperture periphery is substantially tangential to the arcuate surface 85 of the retaining shelf 70. When the retaining shelf 70 is in the deployed position with the padlock fastened through the aperture 142, the shelf 70 is held substantially immobile, having little or no play at the interface of the lower surface of the horizontal planar portion 80 and the upper surface of the handwheel 26. Thus, if the aperture 142 is properly positioned within the locking flange 140, the retaining shelf 70 is prevented from pivoting from its deployed position. Consequently the handwheel 26 cannot be rotated and retention means 25 may not be moved from its retention position, thus preventing unauthorized or accidental removal of the hitching ball 22 from the socket 24.

Figure 8:
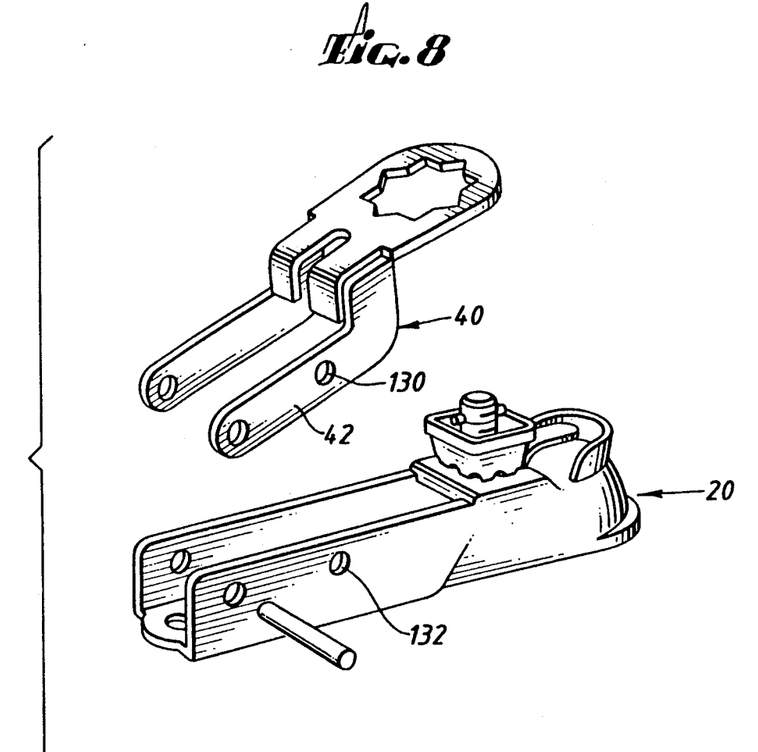
FIG. 8 is a perspective and exploded view of yet another alternate embodiment of the coupler lock mechanism of the present invention.

In an alternate construction, as shown in FIG. 8, the locking feature of the present invention is provided by a clasp opening 130 formed in the first leg 42 of extending arm 40 of the coupler lock mechanism 10. The clasp opening 130 is associated with a corresponding aperture 132 formed in the coupler 20 of the trailer/coupler assembly, and is of such dimension that an ordinary padlock clasp may be engaged therein. This alternate embodiment is particularly suitable for trailers having tongue frames of an open construction.

Figure 5:
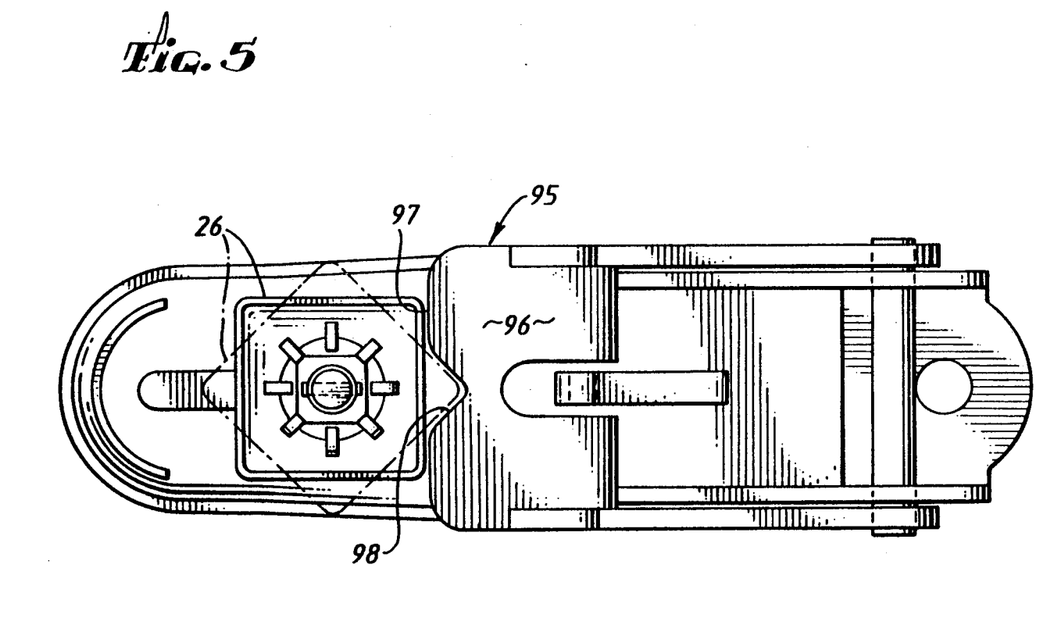
FIG. 5 is a top view of an alternate embodiment of the coupler lock mechanism of the present invention.
Figure 6:
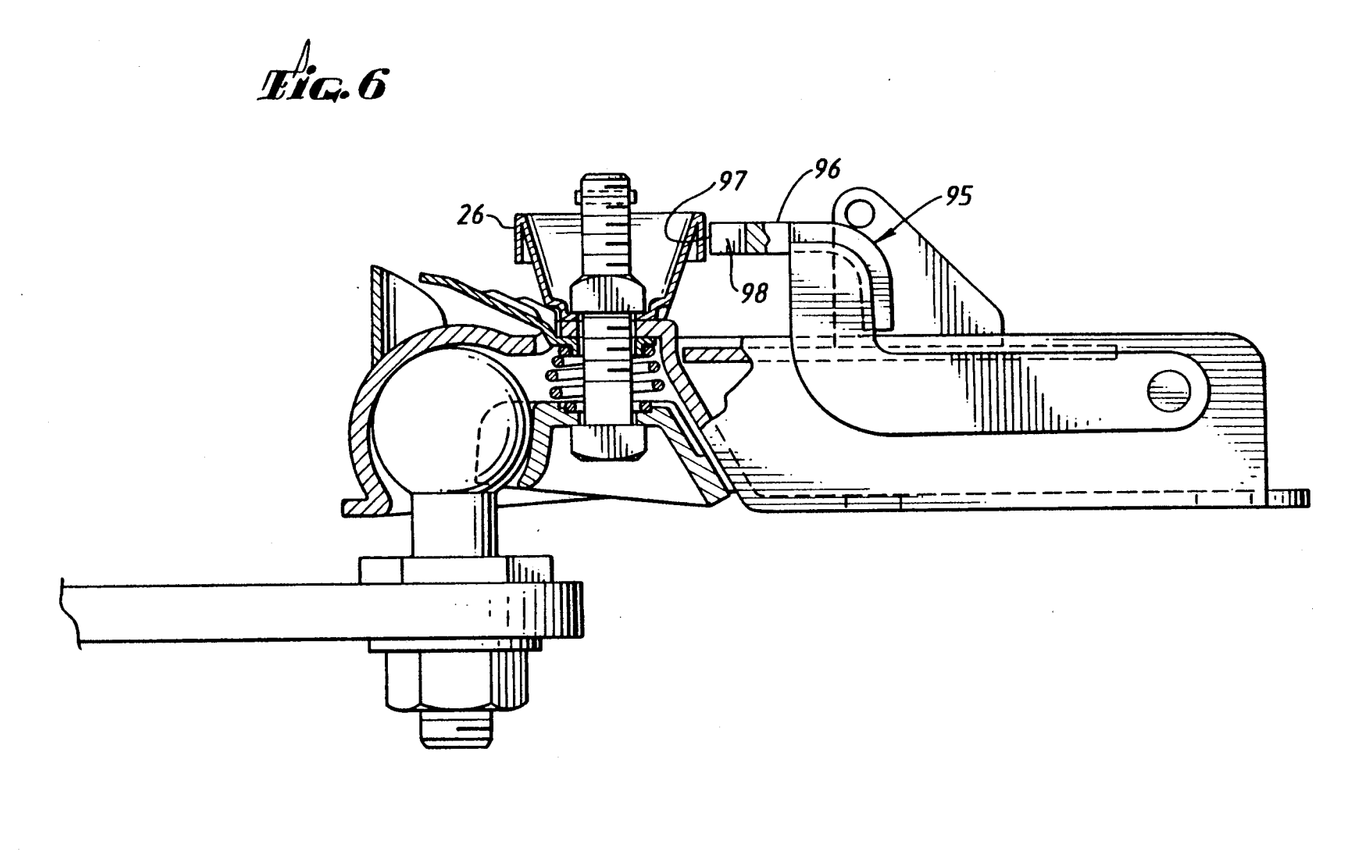
FIG. 6 is a side view, in partial section, of the coupler lock mechanism of FIG. 5.
Figure 7:
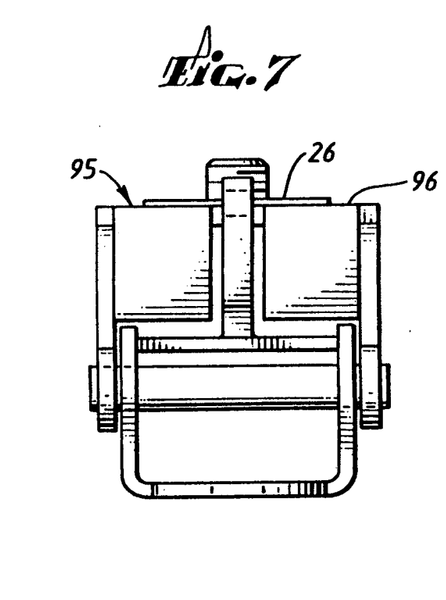
FIG. 7 is an end view of the coupler lock mechanism of FIG. 5.

An alternate embodiment of the invention is shown in FIGS. 5, 6, and 7. The alternate embodiment incorporates a retaining shelf 95 having a horizontal planar portion 96 of an alternate construction. In particular, the horizontal planar portion 96 of the alternate embodiment does not utilize a complete aperture having a shape substantially similar to that of the periphery of the handwheel 26 in two orientations, as shown in the preferred embodiment of FIG. 1. Rather, the embodiment discloses a horizontal planar portion 96 having a engagement notch 98 and wall 97 which also effectively secures the handwheel 26 in a retaining position where the retention flange 25 is in a retention position. Again, in order to align the handwheel 26 with the engagement notch 98 in the shelf 95, the operator need only rotate the handwheel through a maximum 45° revolution from any position. A corner of the handwheel 26 may be secured within the notch 98, or the side of the handwheel may abut against the side surface 97 of the horizontal planar portion 96, as illustrated in FIG. 5. In either position, the handwheel 26 is effectively immobilized.

Figure 9:
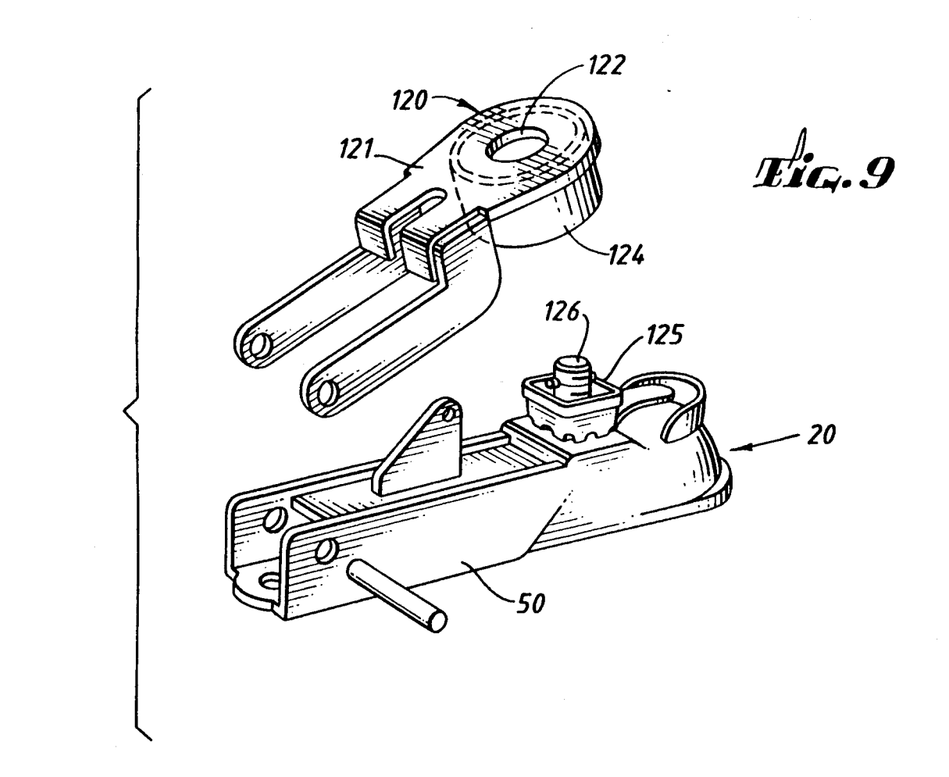
FIG. 9 is a perspective and exploded view of a further alternate embodiment of the coupler lock mechanism of the present invention.

Finally, as shown in FIG. 9, an additional alternate embodiment of the present invention is shown. As disclosed, the alternate embodiment, similar to that shown in FIG. 1, provides a retaining shelf 120 having a horizontal planar portion 121 in which an aperture 122 is formed. The aperture 122, allows the extending threaded member 126 to project therethrough when the retaining shelf 120 is in its deployed position, that is, to a position wherein the retaining shelf 120 is substantially parallel to the frame 50 of the trailer/coupler assembly. As further shown, extending walls 124 are provided, to effectively surround the handwheel 125 of a coupler assembly 20. Since the extending walls 124 prevent the potential thief from manipulating the handwheel 125, the distance between the upper surface of the handwheel 125 and the lower surface of the retaining shelf 120 is of less importance in this embodiment.

OPERATION

In the operation of the embodiment of the invention illustrated in FIGS. 1–4, the trailer/coupler assembly is first aligned over the hitching ball 22 which is attached to the vehicle. The trailer is then lowered such that the socket 24 engulfs the hitching ball 22 therein. The manipulable handwheel 26 is then rotated such that the retaining flange 25 substantially reduces the effective opening of the socket cavity 24 such that the ball 22 may no longer be retracted therethrough. In this position, a position wherein the retention flange 25 is in a retention position, the coupler mechanism 10 is securely coupled.

During the rotation of the handwheel 26, retaining tab 30 is continually depressed by the operator. The depression of the tab 30 disengages the tab 30 from the recesses 27 formed in the periphery of the handwheel 26 Upon positioning the handwheel 26 such that the coupler mechanism 10 is in a coupled condition, the operator releases the tab 30 so that it engages one of the recesses 27 formed in the lower periphery of the handwheel 26, thus securing the handwheel 26. Minor additional rotation of the handwheel 26 might be required to properly align the tab 30 in the recesses 27. Proper alignment of the tab 30 in the recesses 27 helps prevent the handwheel 26 from becoming inadvertently loosened by vibrations, or other unexpected forces.

In order to further secure the trailer to the vehicle, the coupler lock mechanism 10 is pivoted from its free position to its lowered or deployed position. The handwheel 26 of the ball and socket coupler is rotated by the operator such that the corners 28 thereof are properly aligned within the periphery opening 72 in retaining shelf 70. After proper alignment of the handwheel 26 is achieved, the retaining shelf 70 should be in substantially parallel relation to the frame 50 of the trailer/coupler assembly and in a deployed position surrounding the handwheel periphery and preventing rotation thereof. In such position, the locking flange 140 extends through the aperture 76 formed in the retaining shelf 70, the portion thereof containing aperture 142 extending therethrough as well. In order to lock the coupler lock mechanism 20, thereby deterring theft of the trailer, a padlock is inserted through the aperture 142 and secured thereupon. The trailer is thus effectively secured so to prevent the unauthorized removal thereof, from the transport vehicle. Moreover, the trailer is further provided with the additional safety feature of preventing the inadvertent loosening of the handwheel from vibrational or other unexpected forces during transport.

We claim as our invention:

1. A coupler mechanism for coupling a trailer to a towing vehicle, said vehicle including a hitching ball and said trailer having a forwardly extending frame member, the mechanism comprising, in combination:

a socket mounted on the frame member and adapted to receive said hitching ball;

a handwheel mounted on said frame member and having a periphery of a predetermined shape, said hand wheel being rotatable between a retention position and a release position;

means threadedly coupled to the handwheel for retaining said hitching ball in said socket when the handwheel is rotated to the retention position;

a retaining shelf non-removably mounted on said frame member, said shelf being movable between a free position and a deployed position and having at least a portion configured to receive at least a portion of the handwheel periphery and to prevent rotation thereof when said retaining shelf is in the deployed position; and means operatively associated with the frame member for securing said retaining shelf relative to the frame member when the retaining shelf is in the deployed position.

2. A coupler mechanism as claimed in claim 1 wherein said retaining shelf includes at least one extending arm pivotably connected to said frame member.

3. A coupler mechanism as claimed in claim 2 wherein said arm includes at least one pivotable, L-shaped bracket.

4. A coupler mechanism as claimed in claim 3 wherein said L-shaped bracket includes a first and second extending leg.

5. A coupler mechanism as claimed in claim 4 wherein said first extending leg includes an aperture for receiving a cylindrical pivot pin.

6. A coupler mechanism as claimed in claim 4 wherein said second extending leg is of a predetermined length.

7. A coupler mechanism as claimed in claim 4 wherein said first extending leg includes a clasp opening for receiving a clasp of a standard locking mechanism therein.

8. A coupler mechanism as claimed in claim 6 wherein said predetermined length dimension of the second extending leg is substantially equivalent to the distance between a bottom edge of said first extending leg and an upper surface of said handwheel.

9. A coupler mechanism as claimed in claim 2 having two pivotable extending arms separated by a predetermined distance.

10. A coupler mechanism as claimed in claim 9 wherein said predetermined separating distance is greater than a corresponding width dimension of said frame.

11. A coupler mechanism as claimed in claim 1 wherein said retaining shelf includes a horizontal planar portion member and a vertical planar portion member.

12. A coupler mechanism as claimed in claim 11 wherein said retaining shelf is further includes an arcuate member disposed between said horizontal and vertical planar portion members thereby forming an integral shelf unit.

13. A coupler mechanism as claimed in claim 12 wherein said horizontal planar portion member includes a handwheel opening having a periphery substantially similar in shape to at lest a portion of the periphery of said handwheel whereby said opening is adapted to receive the handwheel and restrain the handwheel against rotation.

14. A coupler mechanism as claimed in claim 13 wherein the handwheel opening is of such dimension so as to accommodate a maximum dimension of the handwheel and prevent rotation of the handwheel when the handwheel is positioned therein.

15. A coupler mechanism as claimed in claim 11 wherein said horizontal planar portion includes an engagement notch for engaging a portion of the periphery of the handwheel, thereby preventing rotation of the handwheel when engaged in the engagement notch.

16. A coupler mechanism as claimed in claim 11 wherein said horizontal planar portion member includes an aperture for allowing an elongated threaded member to project therethrough, said aperture having a maximum dimension which is less than a maximum width dimension of the handwheel.

17. A coupler mechanism as claimed in claim 16 wherein said horizontal planar portion member further includes an extending wall extending transversely for a predetermined distance from a lower surface of said horizontal planar portion for surrounding the handwheel.

18. A coupler mechanism as claimed in claim 17 wherein said extending wall forms a cylindrical shell having a minimum diameter dimension slightly larger than a maximum width dimension of the handwheel.

19. A coupler mechanism as claimed in claim 12 wherein said retaining shelf further includes an aperture in said arcuate member for receiving a portion of said means for securing said coupler lock mechanism in a locked position therethrough.

20. A coupler mechanism as claimed in claim 1 wherein said means for securing said retaining shelf in a deployed position includes a locking flange extending through said retaining shelf.

21. A coupler mechanism as claimed in claim 20 wherein said locking flange extends longitudinally along said frame member to which said flange is permanently affixed.

22. A coupler mechanism as claimed in claim 20 wherein said locking flange further includes a locking aperture therein for receiving a clasp of a lock mechanism.

23. A coupler mechanism as claimed in claim 22 including means for surrounding said handwheel, said surrounding means including an upper surface and wherein said locking aperture has a periphery, said locking aperture being formed in an upper portion of said locking flange so that said periphery of said locking aperture is substantially tangential to said upper surface of said means for surrounding said handwheel, so that when said lock mechanism is inserted in said locking aperture, said at least one pivotable extending arm is rendered non-pivotable.

24. A coupler mechanism for coupling a trailer to a towing vehicle, said vehicle including a hitching ball and said trailer having a forwardly extending frame member, the mechanism comprising, in combination:

a socket mounted on the frame member and adapted to receive said hitching ball;

retention means for selectively retaining and releasing said hitching ball in said socket;

a rotatable adjusting handwheel mounted on the frame member;

means for coupling the handwheel to the retention means so that the rotation of the handwheel in one direction actuates the retention means to retain the hitching ball in the socket and rotation of the handwheel in the other direction actuates the retention means to release the hitching ball from the socket; and non-removable locking means mounted on the frame member and having a locking position in which said locking means surrounds said rotatable adjusting handwheel preventing rotation thereof.

25. A coupler mechanism as claimed in claim 24 wherein said locking means is movable between a deployed and free position for preventing rotation of said adjusting handwheel when in a deployed position and allowing rotation of said handwheel when in a free position.

26. A coupler mechanism as claimed in claim 25 further including the means for securing said locking means in a deployed position.

27. A coupler mechanism for coupling a towing vehicle and a trailer comprising, in combination:

a hitching ball mounted on the vehicle;

a socket mounted on the trailer for receiving said hitching ball;

retention means mounted on the trailer and movable between a retention position and a release position, for retaining said hitching ball in said socket when in the retention position and for releasing said hitching ball from said socket when in the release position;

means having a user manipulable, rotatable handwheel for actuating the retention means between the retention position and release position when the handwheel is manipulated, said handwheel having a periphery of a predetermined shape;

means movable to a deployed position for surrounding said handwheel and preventing rotation thereof, said surrounding means including a retaining shelf having at least a portion configured to substantially conform to at least a portion of the predetermined shape of the handwheel, said configured portion of said shelf being adapted to receive and to mate with at lest a portion of said shaped handwheel periphery to prevent rotation thereof; and locking means mounted on said trailer for securing said surrounding means in a deployed position.

28. A coupler mechanism for coupling a towing vehicle and a trailer comprising, in combination:

a hitching ball mounted on the vehicle;

a socket on the trailer for receiving said hitching ball;

retention means on said trailer movable between a retention position and a release position for retaining said hitching ball in said socket when in the retention position and for releasing said hitching ball from said socket when in the retention position;

rotatable means on said trailer for actuating the retention means between the retention position and the release position when rotated;

non-removable means mounted on the trailer and movable to a deployed postion for surrounding said rotatable means and preventing access to the rotatable means to prevent rotation thereof; and locking means for securing said surrounding means in the deployed position.

29. A coupler mechanism as claimed in claim 1 wherein the configured portion substantially conforms to at least a portion of the predetermined shape of the handwheel.

* * * * *